United States Patent
Kim

(10) Patent No.: US 9,929,640 B2
(45) Date of Patent: Mar. 27, 2018

(54) INTEGRATED-TYPE TRANSFORMER

(71) Applicant: LG INNOTEK CO., LTD., Seoul (KR)

(72) Inventor: Dong Hee Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 226 days.

(21) Appl. No.: 14/443,704

(22) PCT Filed: Nov. 14, 2013

(86) PCT No.: PCT/KR2013/010362
§ 371 (c)(1),
(2) Date: May 19, 2015

(87) PCT Pub. No.: WO2014/081155
PCT Pub. Date: May 30, 2014

(65) Prior Publication Data
US 2015/0303792 A1    Oct. 22, 2015

(30) Foreign Application Priority Data

Nov. 20, 2012 (KR) .................... 10-2012-0131885
Nov. 23, 2012 (KR) .................... 10-2012-0133872

(51) Int. Cl.
*H01F 5/00* (2006.01)
*H02M 1/42* (2007.01)
(Continued)

(52) U.S. Cl.
CPC ............ *H02M 1/4241* (2013.01); *H01F 3/14* (2013.01); *H01F 5/00* (2013.01); *H01F 27/24* (2013.01); *H01F 27/40* (2013.01); *H01F 37/00* (2013.01); *H02M 1/4225* (2013.01); *H02M 3/33569* (2013.01); *H01F 27/38* (2013.01); *H02M 3/337* (2013.01); *H02M 2001/007* (2013.01); *H02M 2001/0058* (2013.01); *Y02B 70/126* (2013.01); *Y02B 70/1491* (2013.01)

(58) Field of Classification Search
CPC ..................... H01F 5/00; H01F 27/00–27/36
USPC .... 336/65.83, 196, 198, 200, 212, 220–223, 336/232
See application file for complete search history.

(56) References Cited

U.S. PATENT DOCUMENTS 2,561,855 A * 7/1951 Gould .................. H01F 38/10
315/280
2,992,386 A * 7/1961 Rosin .................... G05F 3/06
323/306
(Continued)

FOREIGN PATENT DOCUMENTS

| JP | 2009-059995 A | 3/2009 |
| KR | 10-2007-0093349 A | 9/2007 |
| KR | 10-2012-0072809 A | 7/2012 |

OTHER PUBLICATIONS

International Search Report dated Mar. 25, 2014 issued in Application No. PCT/KR2013/010362 (with English translation).

*Primary Examiner* — Tuyen Nguyen
(74) *Attorney, Agent, or Firm* — KED & Associates

(57) ABSTRACT

An integrated-type transformer according to an embodiment includes a linear-type magnetic member; a power factor correction circuit disposed to a left of the linear-type magnetic member and including an inductor; and a transformer disposed to a right of the linear-type magnetic member and including a primary coil and a secondary coil.

10 Claims, 20 Drawing Sheets

(51) Int. Cl.
*H01F 27/40* (2006.01)
*H01F 37/00* (2006.01)
*H01F 27/24* (2006.01)
*H02M 3/335* (2006.01)
*H01F 3/14* (2006.01)
H01F 27/38 (2006.01)
H02M 3/337 (2006.01)
H02M 1/00 (2006.01)

(56) References Cited

U.S. PATENT DOCUMENTS

| | | | | |
|---|---|---|---|---|
| 3,686,561 A | * | 8/1972 | Spreadbury | G05F 3/06 323/308 |
| 5,266,916 A | * | 11/1993 | Kijima | H01F 27/266 336/160 |
| 5,309,350 A | * | 5/1994 | Kijima | H05B 41/2822 315/220 |
| 7,242,275 B2 | * | 7/2007 | Poniatowski | H01F 27/38 336/226 |
| 7,884,694 B2 | * | 2/2011 | Hsueh | H01F 27/38 336/198 |
| 8,159,323 B2 | * | 4/2012 | Sugimura | H01F 27/30 336/221 |
| 9,224,530 B2 | * | 12/2015 | Kim | H01F 27/38 |
| 2008/0025052 A1 | | 1/2008 | Yasumura | |
| 2010/0320994 A1 | | 12/2010 | Hashino et al. | |
| 2011/0310638 A1 | | 12/2011 | Kim et al. | |
| 2012/0294046 A1 | * | 11/2012 | Nate | H02M 1/4225 363/21.01 |
| 2014/0265575 A1 | * | 9/2014 | Shih | G05F 1/577 307/31 |

* cited by examiner

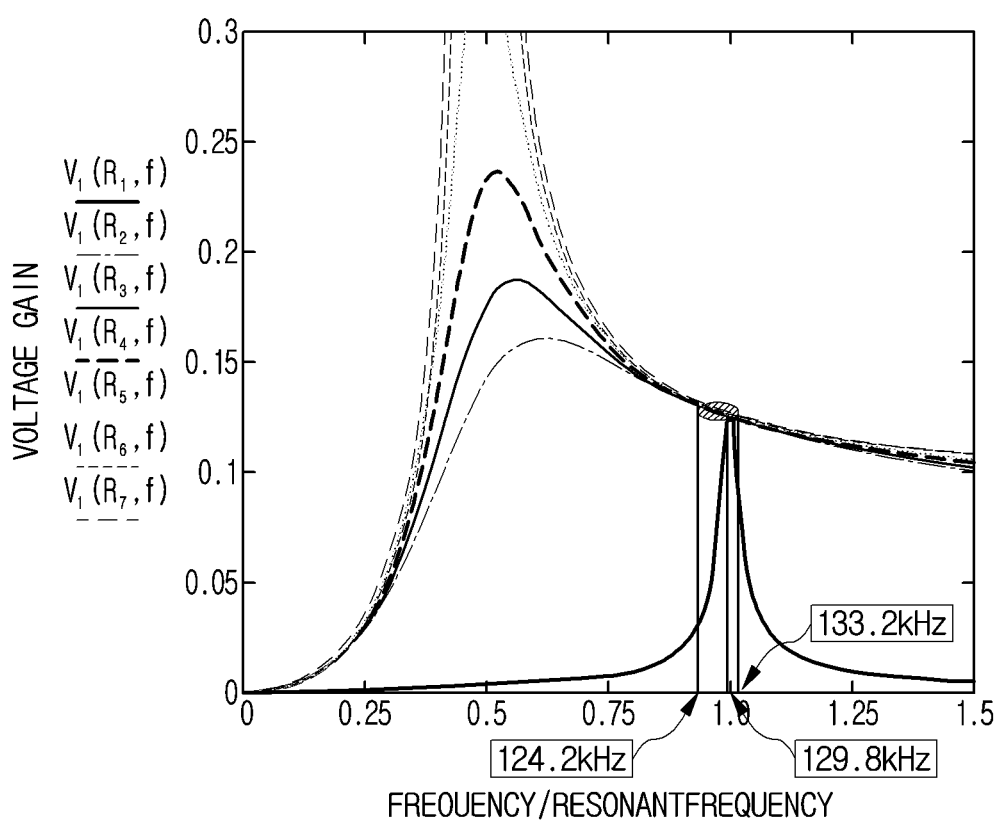

INTEGRATED-TYPE TRANSFORMER

CROSS-REFERENCE TO RELATED PATENT APPLICATIONS

This application is a U.S. National Stage Application under 35 U.S.C. § 371 of PCT Application No. PCT/KR2013/010362, filed Nov. 14, 2013, which claims priority to Korean Patent Application Nos. 10-2012-0131885, filed Nov. 20, 2012 and 10-2012-0133872, filed Nov. 23, 2012, whose entire disclosures are hereby incorporated by reference.

TECHNICAL FIELD

The embodiment relates to an integrated-type transformer.

BACKGROUND ART

In recent years, a power supply device employing a switching mode power supply (SMPS) has attracted attention. The SMPS provides stable power by using a switching device, such as a metal oxide semiconductor field effect transistor (MOS FET) or a bipolar junction transistor (BJT), and a transformer.

The SMPS includes a power factor correction (PFC) circuit for satisfying the harmonic regulation of commercial AC power and a transformer for satisfying safety standard.

In this case, the PFC circuit and the transformer include coils.

That is, the PFC circuit includes an inductor for improving a power factor and the transformer includes a primary coil and a secondary coil for voltage transformation.

In the related art, the PFC circuit is implemented by forming the inductor in one structure, and the transformer is implemented by forming a primary coil and a secondary coil in another structure, respectively.

In other words, the inductor constituting the PFC circuit and the primary and secondary coils constituting the transformer are formed in mutually different structures, such that the PFC circuit and the transformer are manufactured. Thus, according to the related art, an interaction between the PFC circuit and the transformer may be effectively reduced.

Meanwhile, as household appliances have tended to be developed in a light and slim structure with a small size, the SMPS has been requested to be implemented in a slim structure.

However, as described above, since the PFC circuit and the transformer are configured in mutually different structures, the PFC circuit and the transformer have greater volumes than other components constituting the SMPS.

DISCLOSURE

Technical Problem

The embodiment provides an integrated-type transformer including a PFC circuit and a transformer configured with one component.

In addition, the embodiment provides an integrated-type transformer which is capable of minimizing volumes filled with a PFC circuit and a transformer.

Technical Solution

According to one embodiment, there is provided an integrated-type transformer which includes: a linear-type magnetic member; a power factor correction circuit disposed to a left of the linear-type magnetic member and including an inductor; and a transformer disposed to a right of the linear-type magnetic member and including a primary coil and a secondary coil.

In addition, according to another embodiment, there is provided an integrated-type transformer which includes: a bobbin including a first winding part formed at a first side with respect to a center and a second winding part formed at a second side with respect to the center; a linear-type magnetic member received in a central region of the bobbin; a first bending-type magnetic member received at the first side of the bobbin; a second bending-type magnetic member received at the second side of the bobbin; an inductor wound around the first winding part of the bobbin and constituting a power factor correction circuit; and primary and secondary coils wound around the second winding part of the bobbin and constituting a transformer.

Advantageous Effects

According to the integrated-type transformer of the embodiment, the PFC circuit and the transformer are configured with one component, so that the volume of the power supply device including the PFC circuit and the transformer may be minimized.

In addition, according to the integrated-type transformer of the embodiment, the PFC circuit and the transformer are configured with one component, so that the productivity of the power supply device may be improved.

In addition, according to the integrated-type transformer of the embodiment, an oscillating phenomenon, which is generated at a time point when the operating frequency of the PFC circuit is approximate to that of the transformer, may be removed by determining the operating frequency of the transformer according to the operating frequency of the PFC circuit, so that the circuit reliability may be secured.

DESCRIPTION OF DRAWINGS

FIG. 14 is a graph showing the voltage gain characteristic of a transformer according to the related art.

BEST MODE

[Mode for Invention]

Hereinafter, embodiments will be described in detail with reference to accompanying drawings so that those skilled in the art can easily work with the embodiments. However, the embodiments are not limited thereto and may be variously modified.

In the following description, when a predetermined part is referred as to "include" a predetermined component, the predetermined part does not exclude other components, but may further include other components unless indicated otherwise.

Hereinafter, an integrated-type transformer for a power supply device including a power factor correction (PFC) circuit, in which an inductor constituting the PFC circuit and primary and secondary coils constituting a transformer are integrally formed as a single component, will be described in detail.

Figure 1:
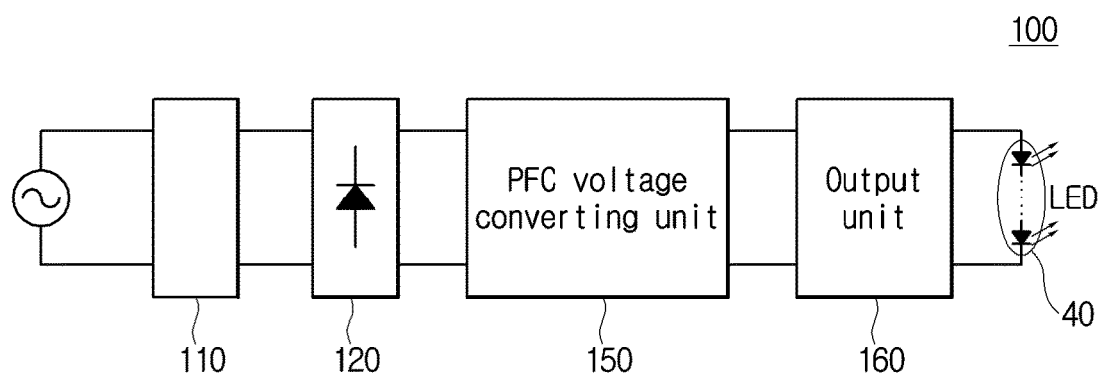
FIG. 1 is a block diagram showing a power supply device according to an embodiment.
Figure 2:
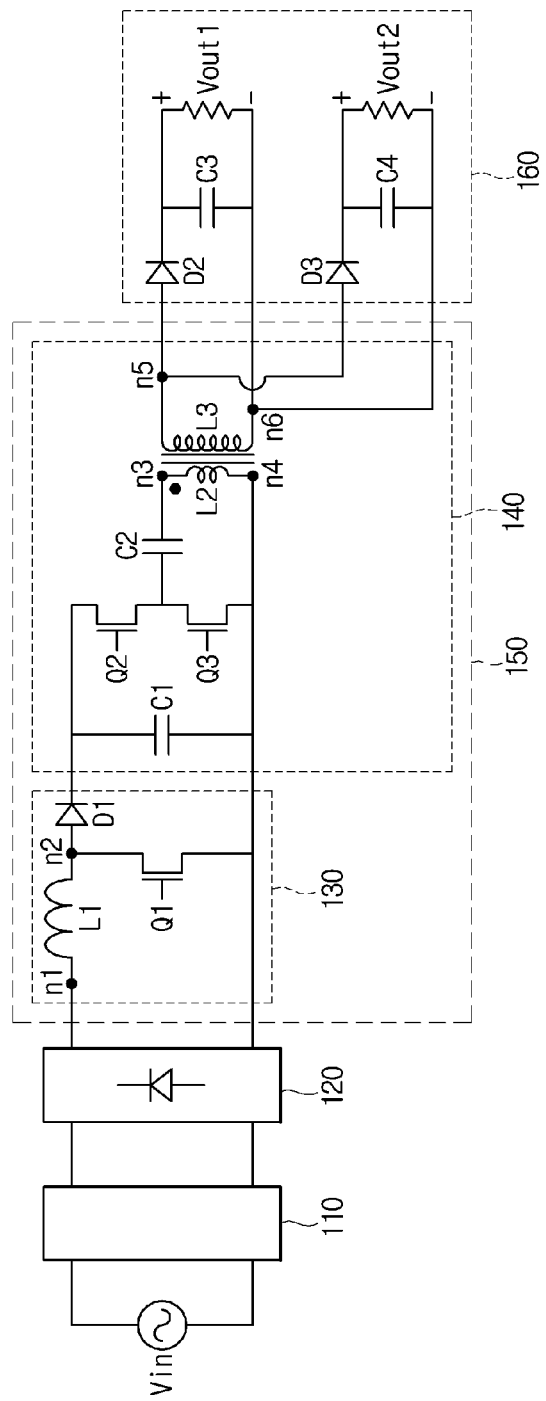
FIG. 2 is a circuit diagram showing the power supply device of FIG. 1

FIG. 1 is a block diagram showing a power supply device according to an embodiment. FIG. 2 is a circuit diagram showing the power supply device of FIG. 1.

Referring to FIG. 1, a power supply device for supplying power to an LED 40 includes an input power source, an input unit 110, a rectifying unit 120, a PFC voltage converting unit 150 and an output unit 160.

In this case, the PFC voltage converting unit 150 includes a PFC circuit 130 and a voltage converting unit 140, each of which includes at least one device constituting it.

That is, the PFC voltage converting unit 150 includes an inductor constituting the PFC circuit 130 and the voltage converting unit 140 includes primary and secondary coils.

The LED 40 may be a light emitting device. Preferably, the LED 40 may be a plurality of light emitting diodes. The power supply device converts AC power input from an outside into a DC voltage having a predetermined level and outputs the DC voltage to the LED 40.

The input unit 110 includes an input filter for blocking an overcurrent of an AC voltage input from an outside.

The input filter may include at least one inductor.

The rectifying unit 120 rectifies an AC voltage applied from the input unit 110. The rectifying unit 120 may include a bridge rectifier.

The PFC circuit 130 compensates the power factor of the voltage rectified by the rectifier and outputs the voltage having the compensated power factor to the voltage converting unit 140.

That is, a plurality of diodes of a bridge rectifier constituting the rectifying unit 120 are tuned on only at a predetermined operating voltage or more to output the input voltage. Thus, the output voltage of the rectifying unit 120 is not a square wave. Therefore, a power non-input section in which power is not input to the voltage converting unit 140 may exist, so that the power factor may be lowered.

The PFC circuit 130 includes a first inductor L1 for compensating the power factor. The PFC circuit 130 stores energy in the first inductor L1, so that the power stored in the first inductor L1 is output to the voltage converting unit 140 during the power non-input section, thereby compensating the power factor.

To this end, the PFC circuit 130 includes a first inductor L1 connected between first and second nodes n1 and n2 corresponding to an output line of the rectifying unit 120, a first transistor Q1 connected between the second node n2 and the ground to be turned on or off according to a control signal, the first transistor Q1 to allow energy to be stored in the first inductor L1 and be output the stored energy, and a first diode D1 provided between the second node n2 and the voltage converting unit 140.

The first diode D1 prevents current from flowing in a reverse direction.

Meanwhile, the voltage converting unit 140 includes a transformer which receives power from the PFC circuit 130, converts the input voltage into a voltage according to a switch operation and outputs the converted voltage.

The voltage converting unit 140 may include second and third transistors Q2 and Q3 connected in series to the input end, and a transformer L2 and L3 connected between the second and third transistors Q2 and Q3 as shown in FIG. 2. That is, the transformer includes first and second coils L2 and L3.

The voltage converting unit 140 may include a capacitor C2 provided between a node between the second and third transistors Q2 and Q3 and the transformer L2 and L3 to configure an LLC transformer, and a capacitor C1 provided to an input end of the voltage converting unit 140.

The second and third transistors Q2 and Q3 of the voltage converting unit 140 are alternately turned on or off to charge the capacitor C2 and convert the charged voltage into an input voltage, so that the input voltage may be stably output.

The transformer L2 and L3 includes two inductors (primary coil and secondary coil) adjacent to each other. In detail, the transformer L2 and L3 includes a second inductor L2 formed between a third node n3 connecting with a capacitor C2, and a fourth node n4 constituting the ground, and a third inductor L3 induced by the second inductor L2.

Both terminals of the third inductor L3 constitute fifth and sixth nodes n5 and n6.

The output unit 160 is connected to the fifth and sixth nodes n5 and n6.

The output unit 160 may include a plurality of output parts for receiving mutually different voltages according to connected points after being connected to a part of the coil constituting the third inductor L3 when the output unit 160 provides mutually different voltages to plural loads.

That is, although the fifth node n5 of the third inductor L3 is depicted as a single node in FIG. 2, the fifth node n5 may include mutually different nodes for the purpose of target voltages of the output end.

In this case, when two output ends exist, each output end includes second and third diodes D2 and D3 connected to the fifth node n5 and output capacitors C3 and C4 connected between each of the diodes D2 and D3 and the sixth node n6.

The power supply device according to an embodiment provides an integrated-type transformer in which the first to third inductors L1 to L3 are configured as a single product.

Hereinafter, an integrated-type transformer according to an embodiment will be described with reference to FIGS. 3 to 6.

Figure 3:
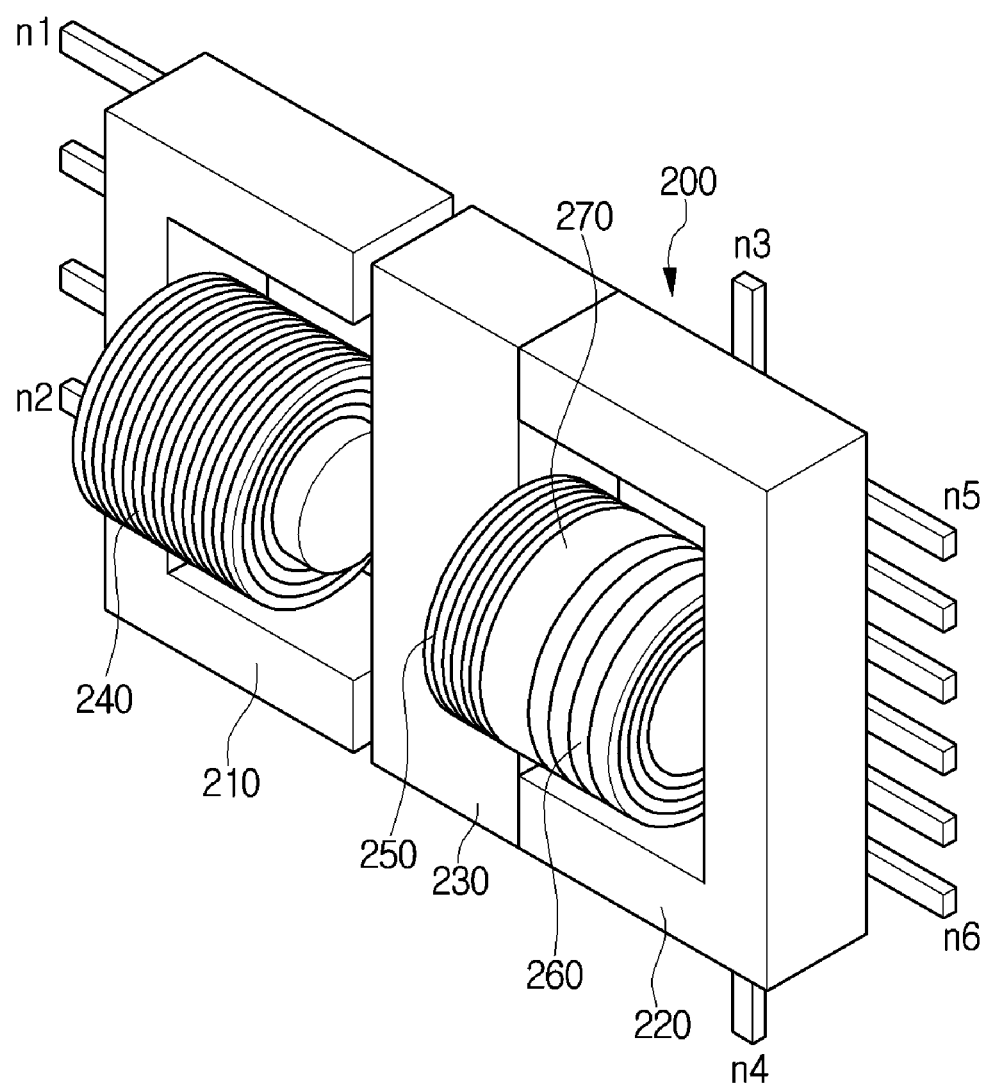
FIGS. 3 to 6 are views illustrating a structure of an integrated-type transformer according to an embodiment.
Figure 4:
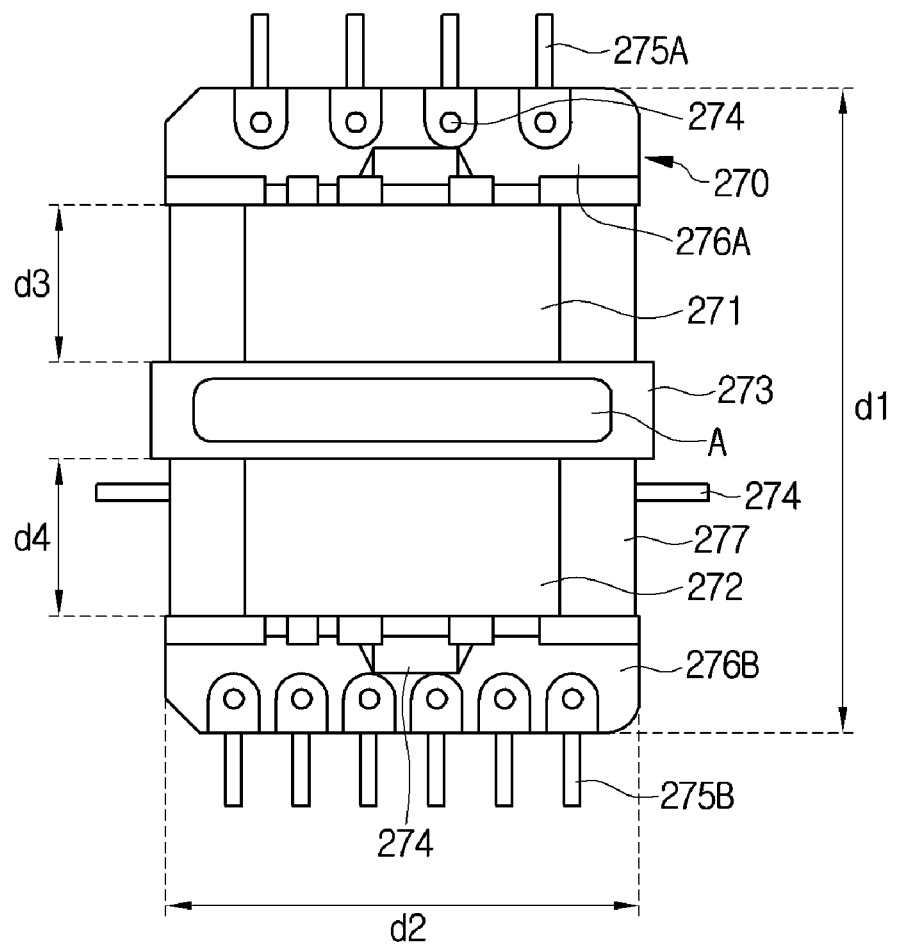
Figure 5:
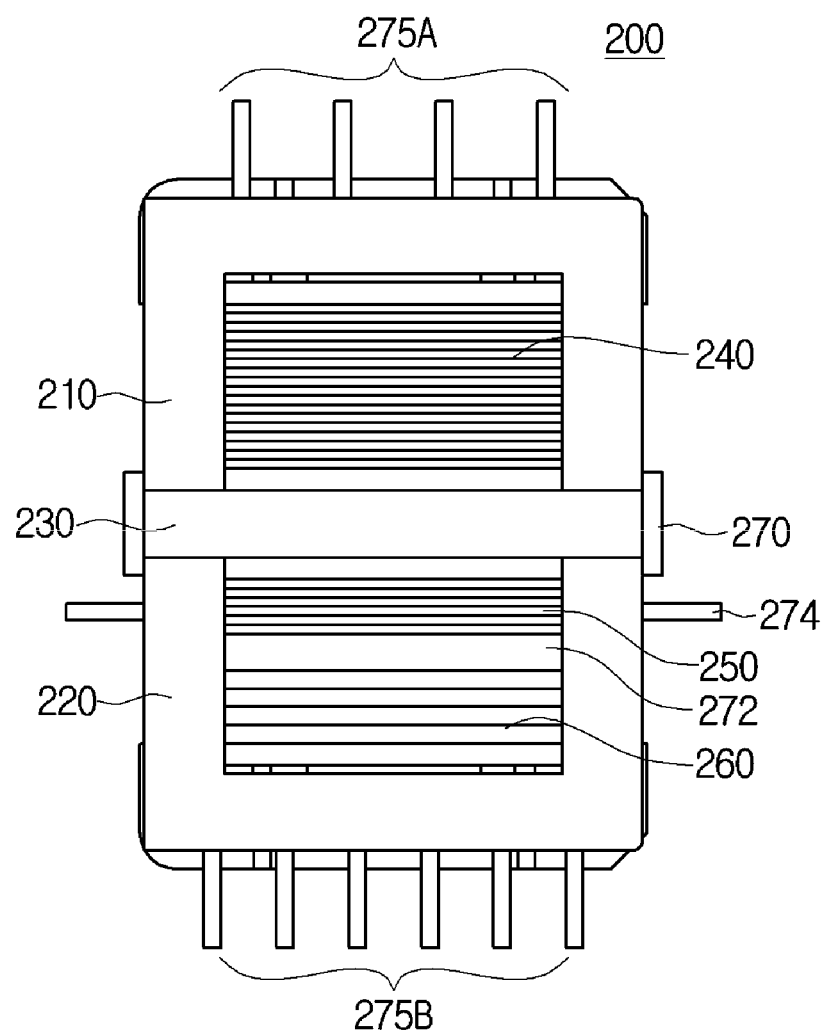

Referring to FIGS. 3 to 5, the integrated-type transformer 200 includes one bobbin 270, the first to third coils 240 to 260 corresponding to the first to third inductors L1 to L3 wound around the bobbin 270, and a plurality of magnetic members 210 to 230.

As shown in FIG. 4, the bobbin 270 has a top surface of a rectangular shape, a first pin part 276A is formed on a first side end, and a second pin part 276B is formed on a second side end opposite to the first side end.

The first pin part 276A may include a plurality of pins 275A connected to the first inductor L1 of the PFC circuit 130, where the pins 275A may include pins connected to the first and second nodes n1 and n2 and a sensing pin.

The second pin part 276B may include a plurality of pins 275B connected to the third inductor L3 of the LLC transformer of the voltage converting unit 140. For example, the second pin part 276B may include six pins.

In addition, the bobbin 270 may further include two side pins 274 provided on a side surface thereof, and the side pins 274 may be connected to the third and fourth nodes n3 and n4.

The bobbin 270 includes a first winding part 271 connected to the first pin part 276A, a second winding part 272 connected to the second pin part and an inserting part 273 formed between the first and second winding parts 271 and 272.

Each of the first and second winding parts 271 and 272 may have a cylindrical shape including a hole therein, where the hole is formed toward the pin part.

The inserting part 273 may cross an end side of the bobbin 270 and may be formed in a central region thereof. The inserting part 273 has a space A for receiving a linear-type magnetic member 230 among a plurality of magnetic members. The linear-type magnetic member 230 may be called an I-shaped magnetic member.

The bobbin 270 may further include a supporting part 277 formed at both sides of the first and second winding parts 271 and 272 to dispose bending-shaped magnetic members 210 and 220, but it may be modified according to a design.

The first coil 240 constituting the first inductor L1 of the PFC circuit 130 is wound around the first winding part 271 of the bobbin 270 and the second and third coils 220 and 230 of the second and third inductors L2 and L3 constituting the LLC transformer are wound around the second winding part 272.

As shown in FIG. 3, the second and third coils 220 and 230 are wound while being spaced apart from each other, so that a part of the second winding part 272 is exposed.

That is, the second and third coils 220 and 230 signify the primary and secondary coils of the transformer, and thus, are wound around the second winding part 272 while being spaced apart from each other by a required insulating interval (for example, 3 mm).

In this case, as shown in FIG. 3, the second coil 250 is wound in a direction adjacent to the first coil 240 and the third coil 260 is wound while being spaced apart from the second coil 250.

In the first to third coils 240 to 260 wound like the above, both ends of the first coil 240 are connected to the pin 275A of the first pin part 276A so that both ends of the first coil 240 are electrically connected to the first and second nodes n1 and n2, both ends of the second coil 250 are connected to the side pin 274 so that both ends of the second coil 250 are electrically connected to the third and fourth nodes n3 and n4, and both ends of the third coil 260 are connected to the pin 275B of the second pin part 276B so that both ends of the third coil 260 are electrically connected to the fifth and sixth nodes n5 and n6.

The first and second winding parts 271 and 272 may include a plurality of slits spaced apart from each other by the same interval, and the coils are wound between the slits.

The bobbin 270 may include polyphenylene sulfide (PPS), liquid crystal polyester (LCP), polybutylene terephthalate (PBT), polyethylene terephthalate (PET), phenolic resin, etc.

A plurality of magnetic members 210 to 230 are inserted into the bobbin 270 around which the coils 240 to 260 are wound.

That is, the magnetic members 210 to 230 include two bending-type magnetic members 210 and 220, and a linear-type magnetic member 230.

The two bending-type magnetic members 210 and 220 have the same shape.

Figure 6A:
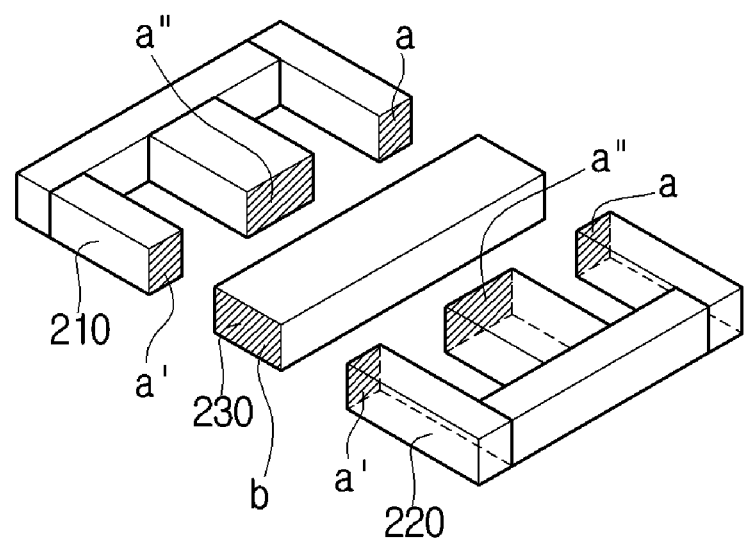
Figure 6B:
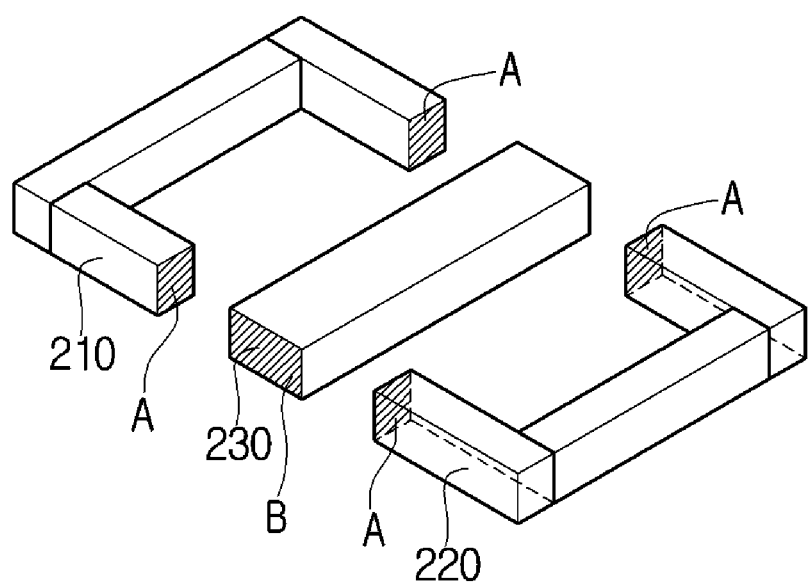

In this case, as shown in FIG. 6A, the two bending-type magnetic members 210 and 220 may have an E-shape. To the contrary, the two bending-type magnetic members 210 and 220 may have a U-shape as shown in FIG. 6B.

Figure 6C:
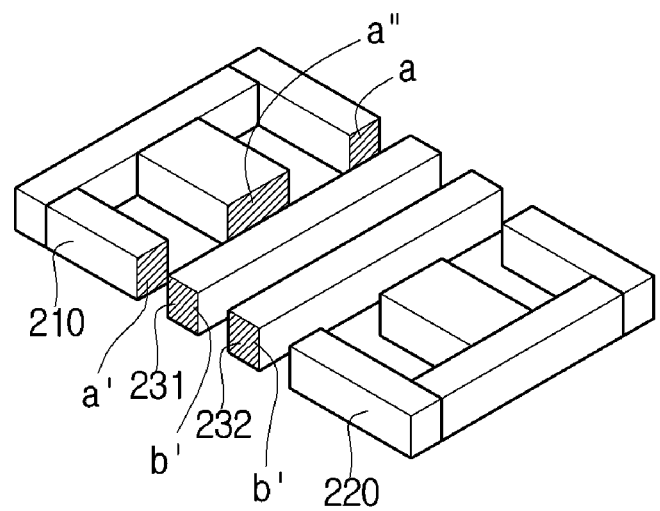

As shown in FIG. 6A, a single linear-type magnetic member 230 may exist. To the contrary, two linear-type magnetic members 230 may exist as shown in FIG. 6C.

In this case, when one linear-type magnetic member 230 exists, it is preferable that the one magnetic member 230 is thickly formed to have an area equal to the sum of the areas of two linear-type magnetic members 230.

In other words, the linear-type magnetic member 230 must hold the magnetic flux for the PFC circuit, and at the same time, must hold the magnetic flux for the transformer.

Thus, the linear-type magnetic member 230 is formed to have a cross-sectional area, such that the linear-type magnetic member 230 can hold all magnetic fluxes of the PFC circuit and the transformer.

In this case, the two bending-type magnetic members 210 and 220 have the same shape.

Thus, the cross-sectional area of the linear-type magnetic member 230 preferably is at least twice larger than that of one of the bending-type magnetic member 210 or 220

Hereinafter, the details will be described in more detail.

FIGS. 3 and 5 show the transformer employing two bending-type magnetic members 210 and 220 having an E-shape and one linear-type magnetic member 230 having an I-shape, where each of the E-shaped bending-type magnetic members 210 and 220 includes a body part disposed in parallel to the I-shaped linear-type magnetic member 230 and three leg parts extending perpendicularly to the body part.

The leg part interposed between the other leg parts is coupled to the bobbin 270 to be inserted into the holes of the first and second winding parts 271 and 272, so that the magnetic flux may be transmitted to the magnetic members 210 to 230.

An air gap is formed between the linear-type magnetic member 230 and the bending-type magnetic member 210 disposed at the inductor L1 of the PFC circuit 130 such that the interference of magnetic flux may be reduced.

In this case, the linear-type magnetic member 230 and the bending-type magnetic member 210 may be spaced apart from each other by a predetermined gap. To the contrary, an insulating material such as resin may be formed between the linear-type magnetic member 230 and the bending-type magnetic member 210.

The magnetic members 210 to 230 may be formed of Mn—Zn ferrite having high permeability, a low loss, high saturation magnetic flux density, stability and a low production cost, but the embodiment is not limited by a type or quality of a material of the magnetic member.

As described above, according to the embodiment, only one bobbin 270 is provided and the first inductor of the PFC circuit is disposed to the left of the bobbin 270, and the second and third inductors (the primary and second coils) are disposed to the right of the bobbin 270 so that an integrated-type transformer having a slim configuration can be provided while reducing the interferences between the inductors.

In this case, the leg parts of each of the bending-type magnetic member 210 and 220 may have the same length or mutually different lengths. A film may be inserted into the leg part having a shorter length, so that the influence of the inductance may be minimized.

The film may be formed of an insulating material such as plastic or polyester, but the embodiment is not limited thereto.

In this case, a length d3 of the first winding part 271 constituting the PFC circuit 130 may be shorter than a length d4 of the second winding part 272 constituting the voltage converting unit 140. The lengths d3 and d4 of the first and second winding parts 271 and 272 may be adjusted according to the winding numbers of coils.

In the bobbin 270, the length d1 of a long side of the body part except for the pins 275A and 275B may be in the range of 3.5 cm to 4 cm, and the length d2 of a short side may be in the range of 3.0 cm to 3.3 cm.

As the integrated-type transformer 200 described above, the linear-type magnetic member 230 is interposed between the bending-type magnetic members 210 and 220, so that the inductor L1 of the PFC circuit 130 is disposed in parallel to the second and third inductors L2 and L3 of the transformer in a traversal direction.

FIGS. 6A to 6D are views illustrating a shape of a magnetic member according to an embodiment.

As shown in FIG. 6A, the magnetic member according to an embodiment includes one linear-shaped magnetic member 230 and two E-shaped magnetic members 210 and 220 disposed at both sides of the linear-shaped magnetic member 230.

In this case, if one linear-shaped magnetic member 230 is provided and the bending-type magnetic member is formed in an E-shape, a cross-sectional area of a bottom surface of the linear-shaped magnetic member is determined by the cross-sectional areas of leg parts of the E-shaped magnetic members 210 and 220.

That is, the linear-shaped magnetic member 230 must hold all magnetic fluxes for the E-shaped magnetic members 210 and 220.

In this case, each of the E-shaped magnetic members 210 and 220 includes an upper leg part, a lower leg part and a middle leg part.

The cross-sectional area a of the upper leg part may be equal to or different from that a' of the lower leg part. However, the cross-sectional area a" of the middle leg part must be at least larger than the sum of the areas a and a' of the upper and lower leg parts.

Meanwhile, the magnetic fluxes through the E-shaped magnetic members 210 and 220 are branched upwardly and downwardly of the linear-shaped magnetic member 230 after flowing out through the middle leg part.

Thus, the cross-sectional area b of the bottom surface of the linear-shaped magnetic member 230 preferably is equal to or larger than those a" of the middle leg parts of the E-shaped magnetic members 210 and 220.

In addition, as shown in FIG. 6B, the magnetic member according to an embodiment includes one linear-shaped magnetic member 230 and two U-shaped magnetic members 210 and 220 disposed at both sides of the linear-shaped magnetic member 230.

In this case, the linear-shaped magnetic member 230 is configured with a single linear-shaped magnetic member. When the bending-type magnetic member is formed in a U-shape, a cross-sectional area of a bottom surface of the linear-shaped magnetic member 230 is determined by the cross-sectional areas of leg parts of the U-shaped magnetic members 210 and 220.

That is, the linear-shaped magnetic member 230 must hold all magnetic fluxes for the U-shaped magnetic members 210 and 220.

Thus, it is preferable that the cross-sectional area B of the bottom surface of the linear-shaped magnetic member 230 is at least twice larger than those B of the middle leg parts of the E-shaped magnetic members 210 and 220.

That is, the U-shaped magnetic members 210 and 220 have the same size and shape. Each of the U-shaped magnetic members 210 and 220 is symmetrical in the longitudinal direction. That is, each of the U-shaped magnetic members 210 and 220 has upper and lower leg parts, the cross-sectional areas A of which are equal to each other.

Thus, the cross-sectional area of the linear-shaped magnetic member 230 is at least twice larger than those A of the U-shaped magnetic members 210 and 220.

As shown in FIG. 6C, the magnetic member according to an embodiment includes two linear-shaped magnetic members 231 and 232, and two E-shaped magnetic members 210 and 220 disposed at both sides of the linear-shaped magnetic members 231 and 232.

In this case, the two linear-shaped magnetic members 231 and 232 have the same size and area.

Thus, preferably, as described in FIG. 6A, the cross-sectional area b' of the bottom surface of each of the two linear-shaped magnetic members 231 and 232 is a half of or larger than the cross sectional area a" of the middle leg part of each E-shaped magnetic member 210 and 220.

Figure 6D:
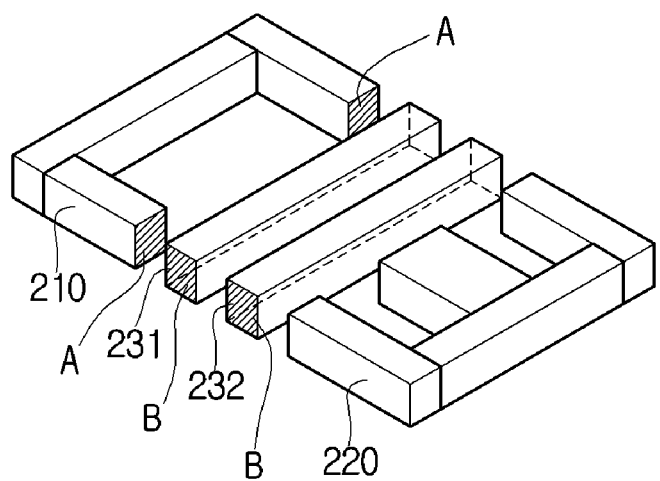

As shown in FIG. 6D, the magnetic member according to an embodiment includes two linear-shaped magnetic members 231 and 232, a U-shaped magnetic member 210 disposed to the left of the linear-shaped magnetic members 231 and 232, and an E-shaped magnetic member 220 disposed to the right of the linear-shaped magnetic members 231 and 232.

In this case, it is preferable that an area B of each of the two linear-shaped magnetic members 231 and 232 is equal to or larger than that of the U-shaped magnetic member 210.

Hereinafter, an integrated-type transformer according to another embodiment will be described in detail with reference to FIGS. 7 to 10.

Figure 7:
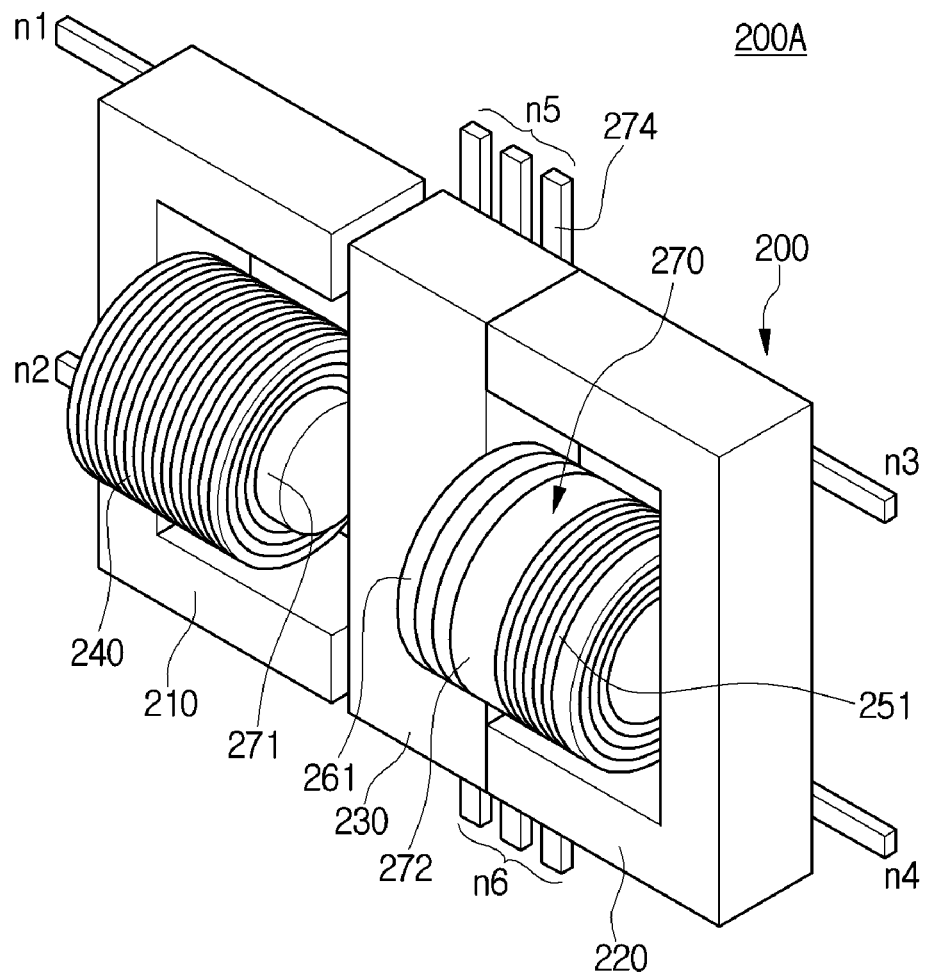
FIG. 7 is a schematic perspective view showing an integrated-type transformer according to another embodiment.
Figure 8:
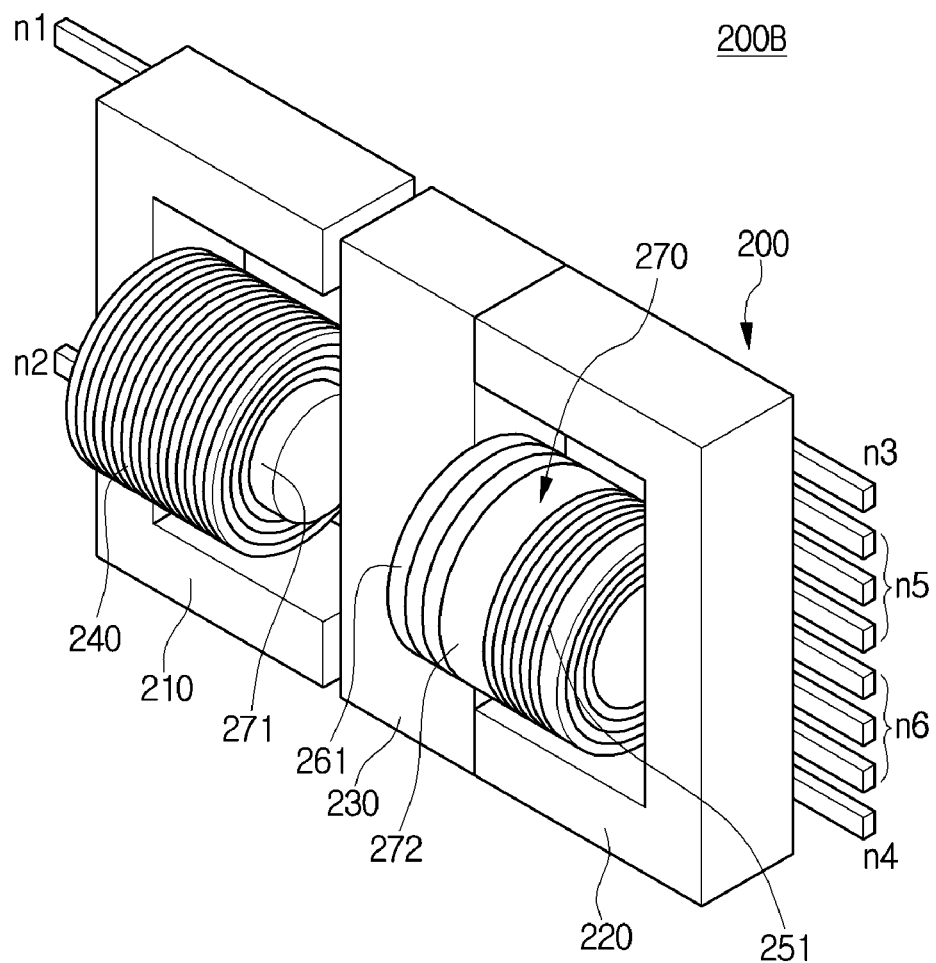
FIG. 8 is a view showing a first modification example of the integrated-type transformer of FIG. 7.
Figure 9:
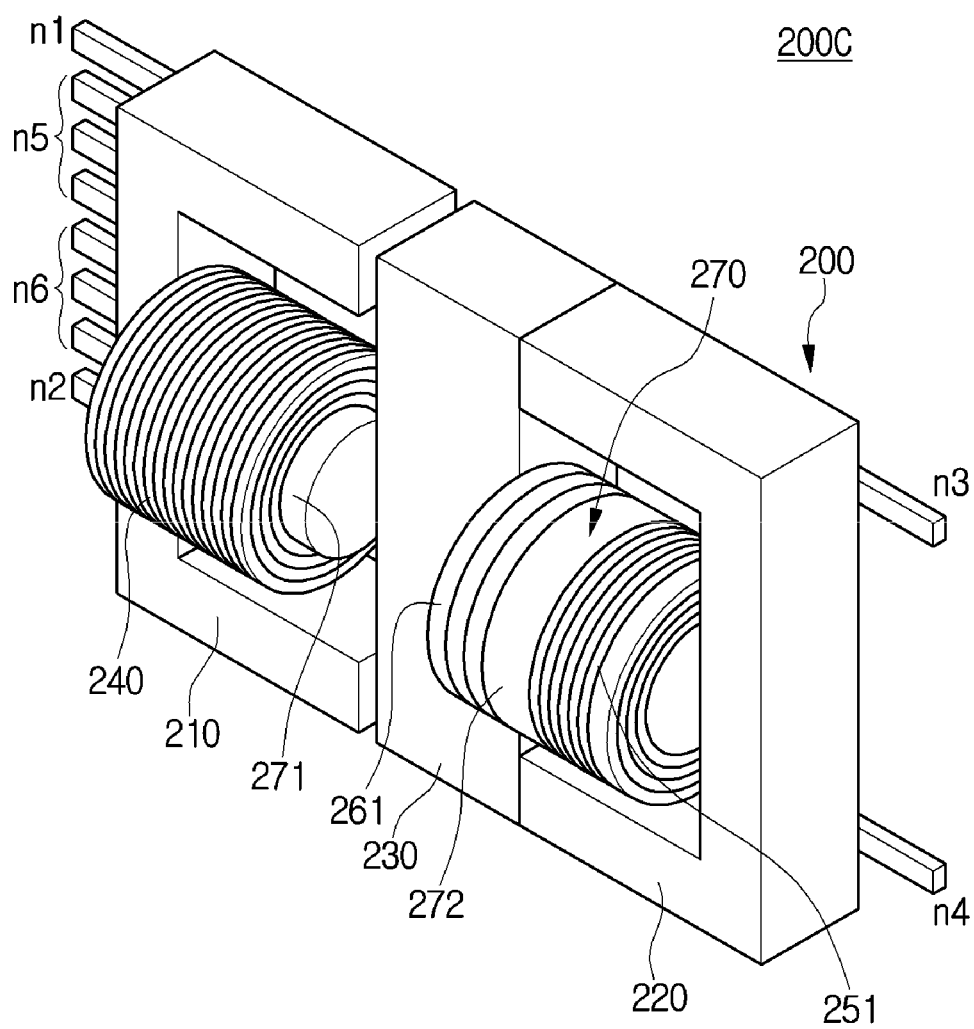
FIG. 9 is a view showing a second modification example of the integrated-type transformer of FIG. 7.
Figure 10:
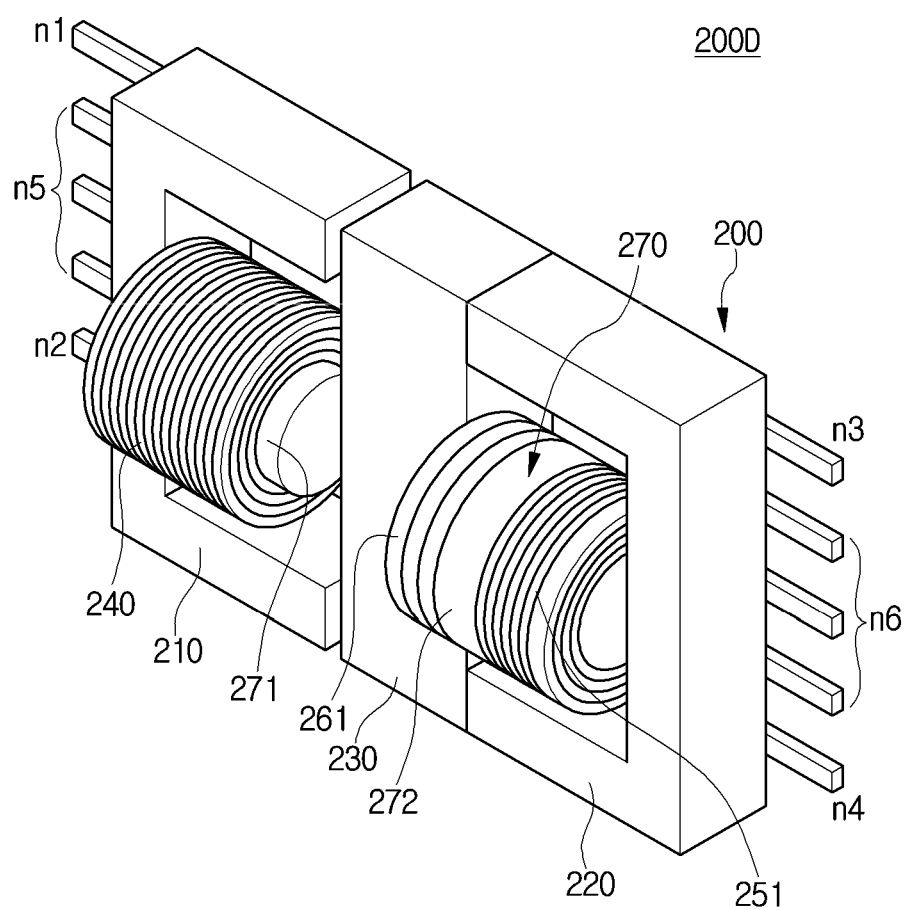
FIG. 10 is a view showing a third modification example of the integrated-type transformer of FIG. 7.
Figure 11A:
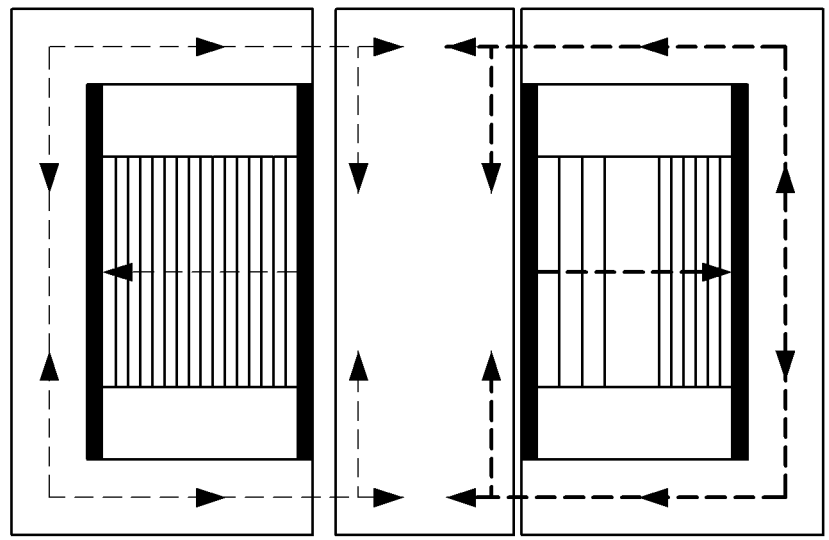
FIGS. 11A and 11B are concept views illustrating magnetic flux flows according to current directions.
Figure 11B:
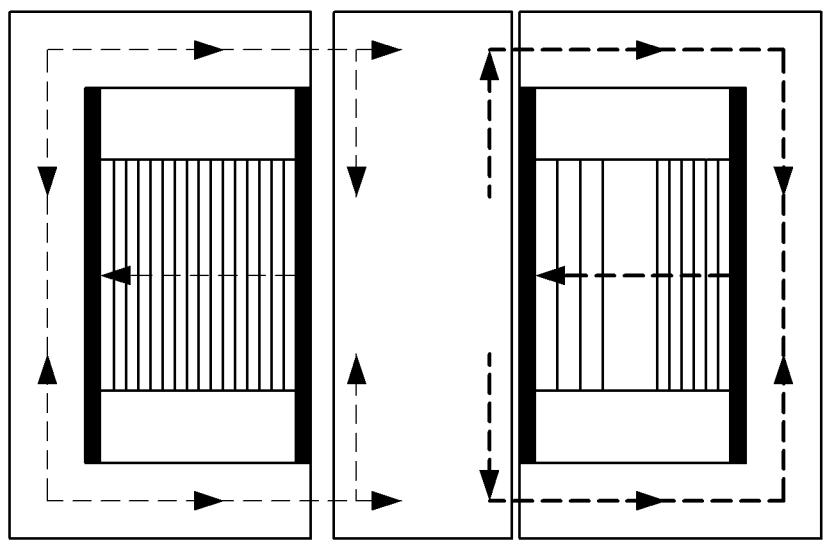

FIG. 7 is a schematic perspective view showing an integrated-type transformer according to another embodiment. FIG. 8 is a view showing a first modification example of the integrated-type transformer of FIG. 7. FIG. 9 is a view showing a second modification example of the integrated-type transformer of FIG. 7. FIG. 10 is a view showing a third modification example of the integrated-type transformer of FIG. 7. FIGS. 11A and 11B are concept views illustrating magnetic flux flows according to current directions.

Referring to FIGS. 7 and 4, the integrated-type transformer 200A includes one bobbin 270, the first to third coils 240, 251 and 261 corresponding to the first to third inductors L1 to L3 wound around the bobbin 270, and a plurality of magnetic members 210 to 230.

The bobbin 270 has a shape substantially equal to that of FIG. 4.

However, a first pin part 276A may include a plurality of pins 275A connected to the first inductor L1 of the PFC circuit 130, where the pins 275A may include pins connected to the first and second nodes n1 and n2 and a sensing pin.

The second pin part 276B may include a plurality of pins 275B connected to the second inductor L2 of the LLC transformer of the voltage converting unit 140, and may be connected to third and fourth nodes n3 and n4.

In addition, the bobbin 270 may further include six side pins 274 provided on a side surface thereof, and the side pins 274 may be connected to the fifth and sixth nodes n5 and n6 connected to the second inductor L2.

The bobbin 270 includes a first winding part 271 connected to the first pin part 276A, a second winding part 272 connected to the second pin part and an inserting part 273 formed between the first and second winding parts 271 and 272.

Each of the first and second winding parts 271 and 272 may have a cylindrical shape including a hole therein, where the hole is formed toward the pin part 276A and 276B.

A linear-type magnetic member 230 is received in the inserting part 273.

The first coil 240 constituting the first inductor L1 of the PFC circuit 130 is wound around the first winding part 271 of the bobbin 270 and the second and third coils 251 and 261 of the second and third inductors L2 and L3 constituting the LLC transformer are wound around the second winding part 272.

As shown in FIG. 7, the second and third coils 220 and 230 are wound while being spaced apart from each other, so that the second winding part 272 is exposed to an outside.

In this case, as shown in FIG. 7, the third coil 261 is wound in a direction adjacent to the first coil 240 and the second coil 251 is wound while being spaced apart from the third coil 261.

In the first to third coils 240, 251 and 261 wound like the above, both ends of the first coil 240 are connected to the pin 275A of the first pin part 276A so that both ends of the first coil 240 are electrically connected to the first and second nodes n1 and n2, both ends of the third coil 261 are connected to the side pin 274 so that both ends of the third coil 261 are electrically connected to the fifth and sixth nodes n5 and n6, and both ends of the second coil 251 are connected to the pin 275B of the second pin part 276B so that both ends of the second coil 251 are electrically connected to the third and fourth nodes n3 and n4.

Meanwhile, differently from that of FIG. 7, any side pins 274 are not formed in the integrated-type transformer 200B of FIG. 8, but pins connected to the fifth and sixth nodes n5 and n6 are further formed in the second pin part 276B of FIG. 4, so that the circuit connections may be implemented with only both pin parts 276A and 276B. As shown in FIG. 9, the integrated-type transformer 200C may further include pins which are formed in the first pin part 276A to be connected to the fifth and sixth nodes n5 and n6. As shown in FIG. 10, the pin connected to the fifth node n5 may be formed in the first pin part 276A and the pin connected to the sixth node n6 may be formed in the second pin part 276B.

As shown in FIG. 9, the pins connected to the fifth and sixth nodes n5 and n6 are further formed in the first pin part 276A, such that the pins are formed at both sides of the bobbin. Thus, the design freedom may be secured so that the process complexity may be reduced.

As shown in FIGS. 8 to 10, when the pins connected to the fifth and sixth nodes n5 and n6 are further formed in the first and second pin parts 276A and 276B of the primary or secondary side, the fifth and sixth nodes n5 and n6 are too closed to each other so that they may be short-circuited with each other. To prevent the short circuit describe above from occurring, the pins may be covered with tubes, respectively.

Differently from the PFC transformer 200 of FIG. 3, according to the integrated-type transformer (200A-D), the third coil 261 of the secondary side is disposed to be adjacent closely to the first coil 240 constituting the inductor L1 of the PFC circuit.

The integrated-type transformer 200A may have magnetic flux flows offset against each other in the linear-type magnetic member as shown in FIG. 8a, or have magnetic flux flows superimposed onto each other according to current polarities in the linear-type magnetic member as shown in FIG. 8b.

When the magnetic fluxes are superimposed onto each other, the superimposed magnetic flux may be concentrated on one side according to the air gap and the number of wound coils of the coil wound leg part of the bending-type magnetic member 210.

For example, when the magnetic flux of the PFC circuit 130 exerts an influence on the voltage converting unit 140, the magnetic flux exerts an influence on an output ripple so that the entire system may be unstable.

Thus, according to the integrated-type transformer 200A of FIG. 7, an air gap is formed between the linear-type magnetic member 230 and the bending-type magnetic member 210 disposed at the inductor L1 of the PFC circuit 130, such that the interference of magnetic flux may be reduced.

In addition, the integrated-type transformer 200A of FIG. 7 is different from the integrated-type transformer 200 of FIG. 3 in the coil winding scheme.

That is, differently from the integrated-type transformer 200 of FIG. 3, in case of FIG. 7, the third coil 262 of the secondary side is disposed to be adjacent closely to the first coil 240 constituting the inductor L1 of the PFC circuit.

As shown in FIG. 7, a degree of interference may be confirmed by measuring a coupling constant after winding coils as shown in FIG. 7 as following table 1.

TABLE 1

| | Measurement scheme | | | |
|---|---|---|---|---|
| | Maxwell 3D simulation | | Impedance analyzer (PSM1735) | |
| Winding scheme | FIG. 3 | FIG. 7 | FIG. 3 | FIG. 7 |
| Mutual inductance | 16.64 uH | 14.828 | 18.6 | 17.52 |
| L (PFC inductor) | 290.27 | 290.53 | 263.8 | 265.9 |
| L (LLC primary side) | 539.92 | 585.95 | 522.8 | 523.3 |
| K (coupling constant) | 0.042 | 0.036 | 0.05 | 0.047 |

Referring to table 1, it is observed that the coupling constant becomes lowered if the winding is implemented as shown in FIG. 7.

That is, the mutual coupling of the integrated-type transformer of FIG. 7 is small so that the resonance current may be not oscillated, thereby stabilizing the operating characteristics.

Hereinafter, the scheme of forming an air gap will be described.

Figure 12A:
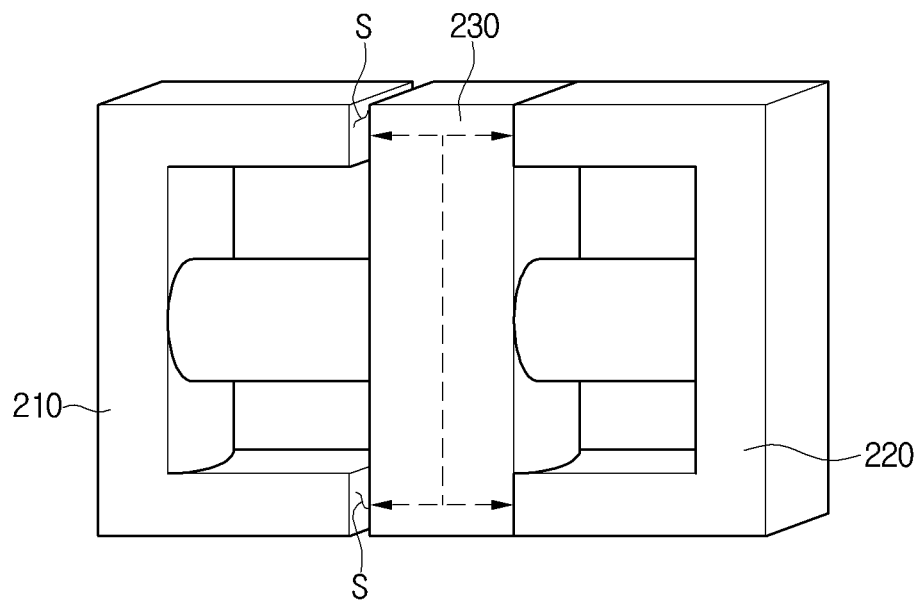
FIG. 12A is a view illustrating an integrated-type transformer having a side air gap.
Figure 12B:
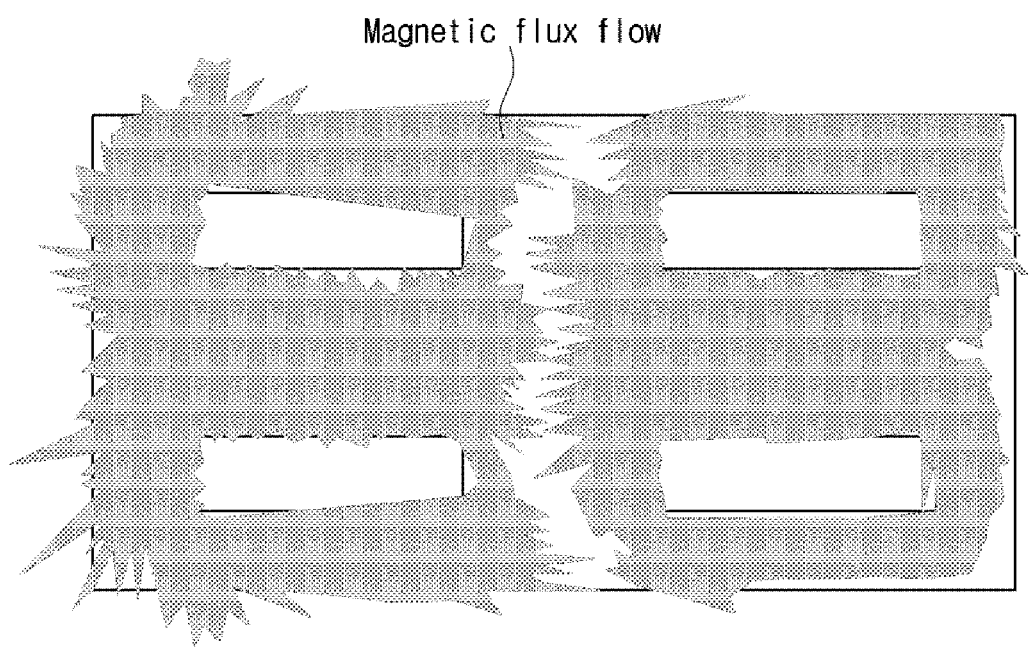
FIG. 12B is a view illustrating the variation of a magnetic flux in an integrated-type transformer having a side air gap.

FIG. 12A is a view illustrating an integrated-type transformer having a side air gap. FIG. 12B is a view illustrating the variation of a magnetic flux of an integrated-type transformer having a side air gap.

Referring to FIG. 12A, a plurality of magnetic members 210 to 230 constituting an integrated-type transformer includes two bending-type magnetic members 210 and 220, and a linear-type magnetic member 230.

The two bending-type magnetic members 210 and 220 have the same shape.

In this case, the two bending-type magnetic members 210 and 220 may have an E-shape.

The E-shaped bending-type magnetic members 210 and 220 each includes an I-shaped body part, an upper leg part extending from an upper portion of the body part in a direction perpendicular to the body part, a lower leg part extending from a lower portion of the body part in a direction perpendicular to the body part, and a central leg part extending from a central portion of the body part in a direction perpendicular to the body part.

In this case, the air gap S may be formed between the upper and lower leg parts of the E-shaped bending-type magnetic member 210 (which corresponds to a magnetic member constituting the PFC circuit) and the linear-type magnetic member 230. The air gap formed like the above will be called a side air gap.

The air gap may be formed by grinding the ends of the upper and lower leg parts of the bending-type magnetic member 210. Differently from the above, the air gap may be formed by inserting an insulating material between the upper and lower leg parts and the linear-type magnetic member.

When a variation of magnetic flux of the integrated-type transformer to which the side air gap described above is examined, as shown in FIG. 12B, it may be confirmed that the magnetic flux flows to an outside of the magnetic member.

That is, when the side air gap described above is applied, the magnetic flux flow is strong, so that interference may be generated between the PFC circuit and the transformer to exert an influence on the device reliability.

Figure 13A:
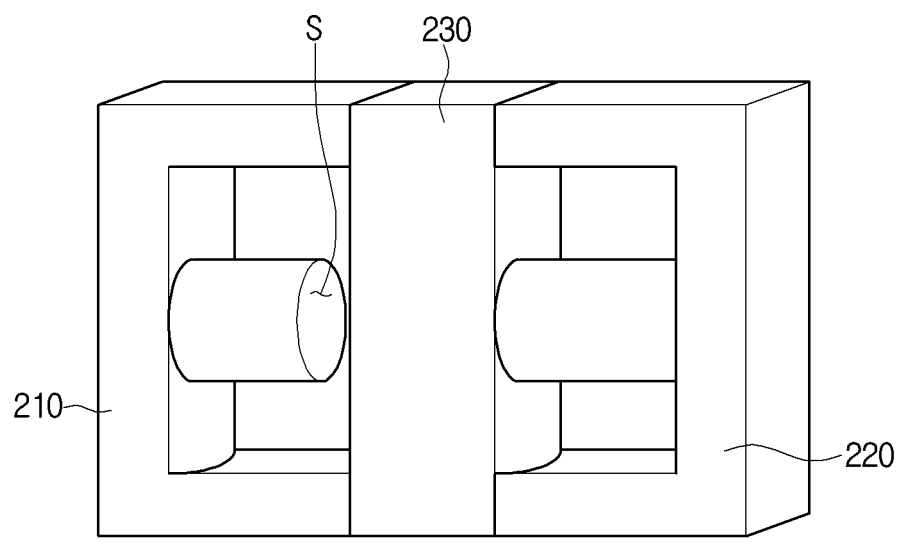
FIG. 13A is a view illustrating an integrated-type transformer having a central air gap.
Figure 13B:
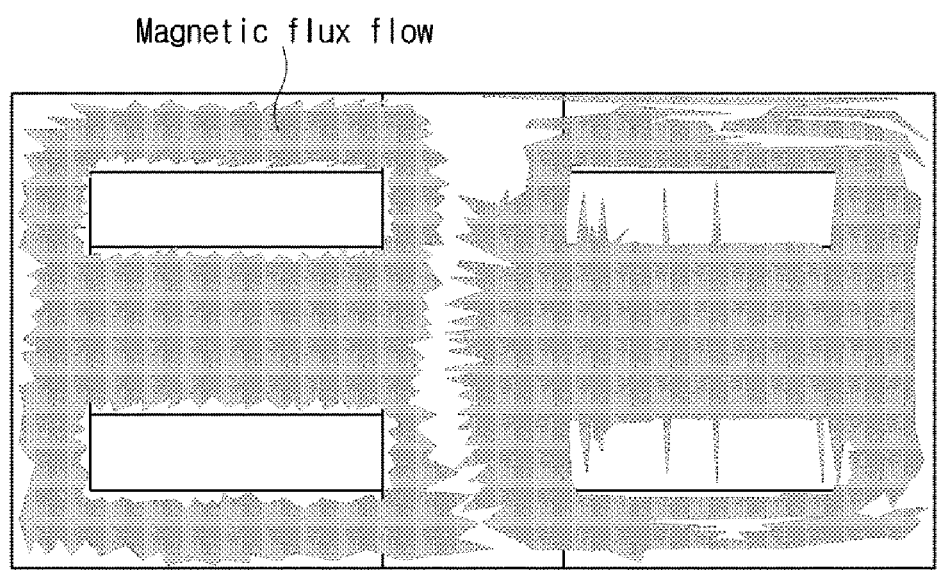
FIG. 13B is a view showing the variation of a magnetic flux in an integrated-type transformer having a central air gap.

FIG. 13A is a view illustrating an integrated-type transformer having a central air gap. FIG. 13B is a view showing the variation of a magnetic flux in an integrated-type transformer having a central air gap.

Referring to FIG. 13A, a plurality of magnetic members 210 to 230 constituting the integrated-type transformer includes two bending-type magnetic members 210 and 220, and a linear-type magnetic member 230.

The two bending-type magnetic members 210 and 220 have the same shape.

In this case, the two bending-type magnetic members 210 and 220 may have an E-shape.

The E-shaped bending-type magnetic members 210 and 220 each includes an I-shaped body part, an upper leg part extending from an upper portion of the body part in a direction perpendicular to the body part, a lower leg part extending from a lower portion of the body part in a direction perpendicular to the body part, and a central leg part extending from a central portion of the body part in a direction perpendicular to the body part.

In this case, the air gap S may be formed between the central leg part of the E-shaped bending-type magnetic member 210 (which corresponds to a magnetic member constituting the PFC circuit) and the linear-type magnetic member 230. The air gap formed like the above will be called a central air gap.

The air gap may be formed by grinding the end of the central leg part of the bending-type magnetic member 210. Differently from the above, the air gap may be formed by inserting an insulating material between the central leg part and the linear-type magnetic member.

When a variation of magnetic flux of the integrated-type transformer to which the central air gap described above is examined, as shown in FIG. 13B, it may be confirmed that the magnetic flux flow occurs only in the magnetic members.

That is, it is known that the magnetic flux flow of the integrated-type transformer having the central air gap is more stable than that of the integrated-type transformer having the side air gap. Therefore, it is preferable to form the air gap in a form similar to that of the central air gap.

Hereinafter, the interference control according to an embodiment will be described with reference to FIGS. 14 to 17.

Figure 15:
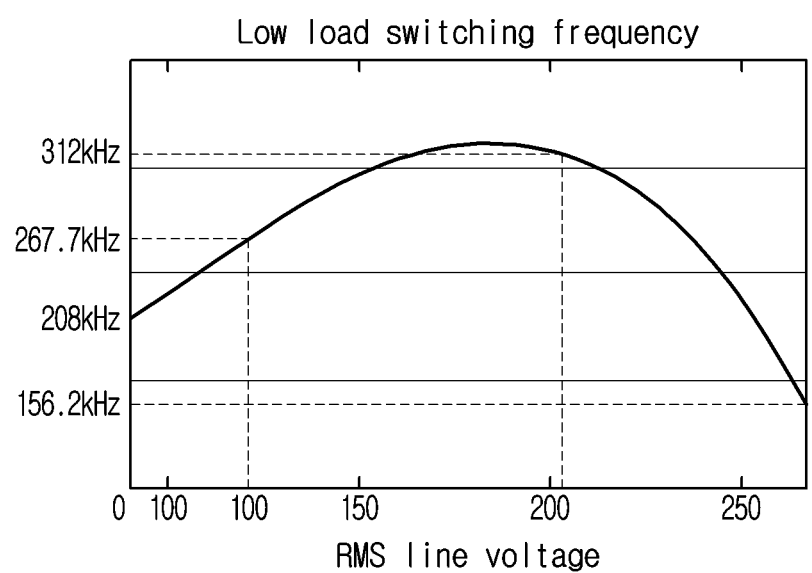
FIGS. 15 and 16 are graphs showing the operating frequency (switching frequency) of a PFC circuit.
Figure 16:
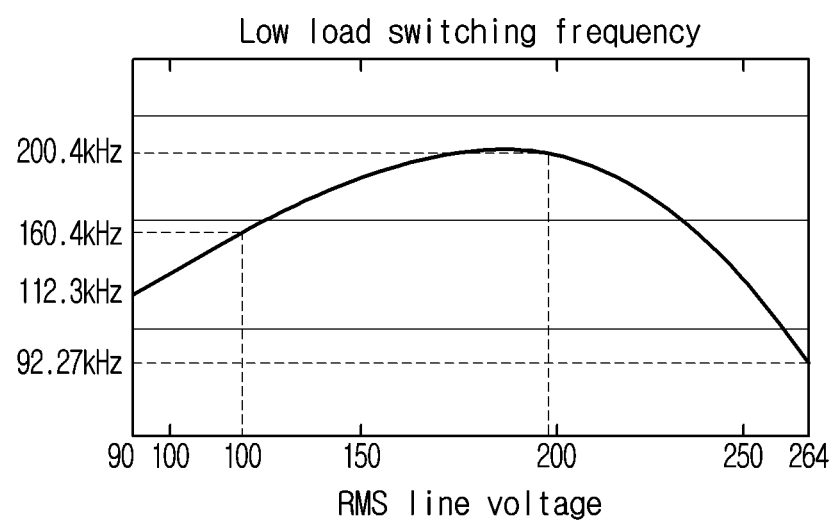
Figure 17:
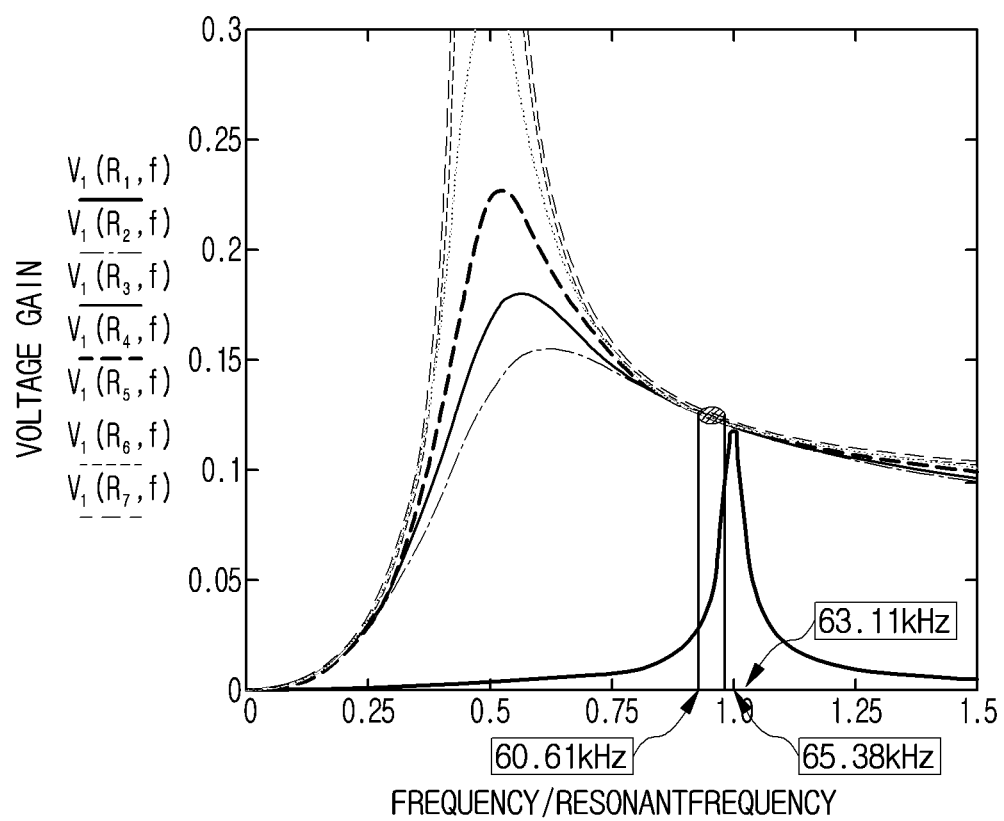
FIG. 17 is a graph showing the voltage gain characteristic of the transformer compensated according to an embodiment.

FIG. 14 is a graph showing the voltage gain characteristic of a transformer according to the related art. FIGS. 15 and 16 are graphs showing the operating frequency (switching frequency) of a PFC circuit. FIG. 17 is a graph showing the voltage gain characteristic of the transformer compensated according to an embodiment.

The operating frequency (resonance frequency) of the LLC transformer may be set to be varied according to a power capacity.

In this case, as shown in FIG. 14, when a resonance point (slant line region) of the LLC transformer is determined in the band of 100 kHz to 130 kHz, the operating frequency of the PFC circuit is shown in FIGS. 15 and 16.

In this case, a rated load PFC switching frequency overlaps an LLC resonant frequency at several voltages.

When the frequencies overlap each other, the resonance current may be oscillated so that an error may occur.

To this end, as shown in FIG. 15, an inductor and a capacitor are designed to allow the LLC resonant frequency to be about ⅓ to about ⅔, preferably ½ of the operating frequency of the PFC circuit, that is, to be in the range of 50 kHz to 70 kHz, so that the overlap may be prevented from occurring. When the operating frequency of the transformer is designed to be greater than half of the maximum operating frequency of the PFC circuit, the overlap may be most effectively prevented from occurring.

Hereinafter, the above will be described in more detail.

Figure 18:
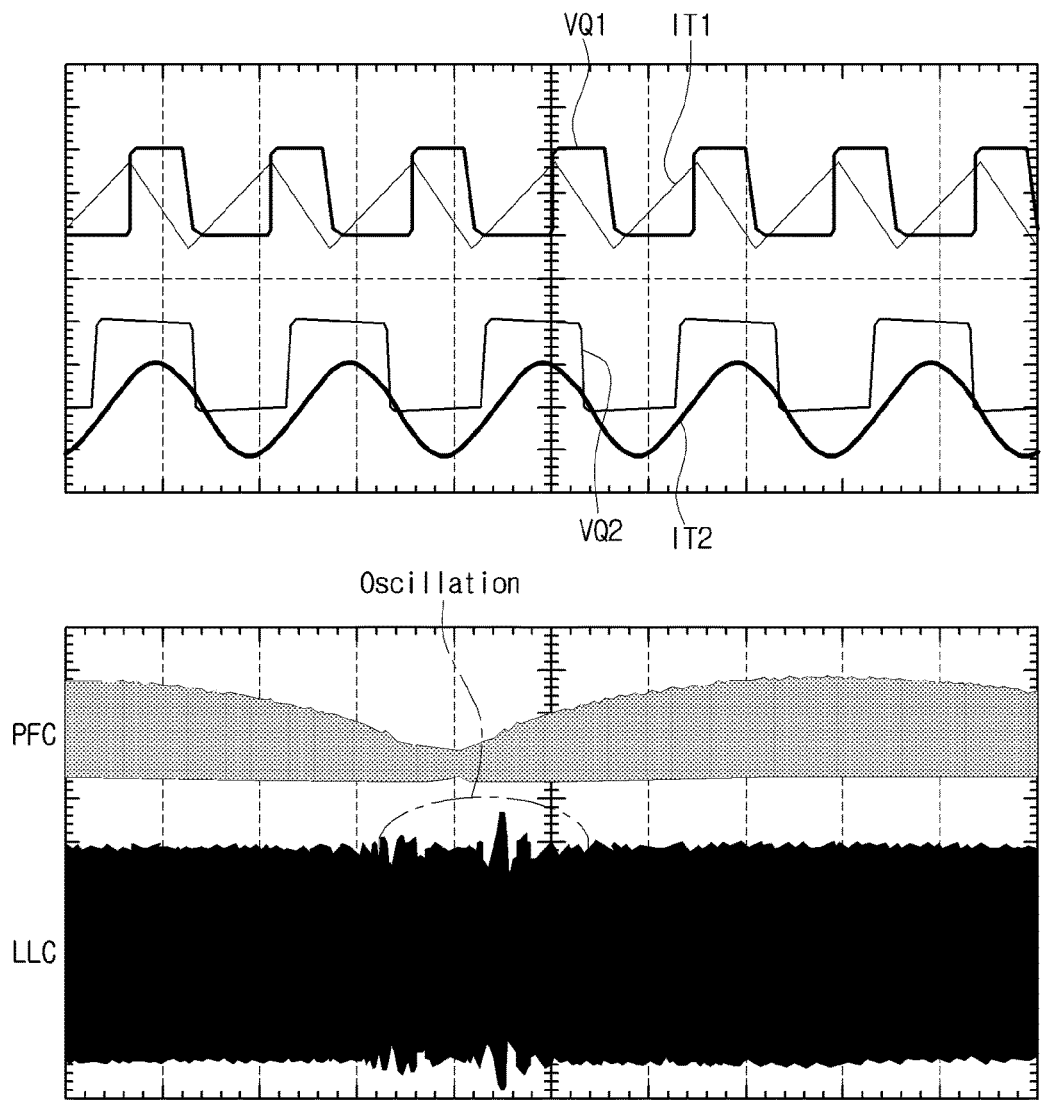
FIG. 18 is a view showing waveforms of each part when an operating frequency is set according to the related art.
Figure 19:
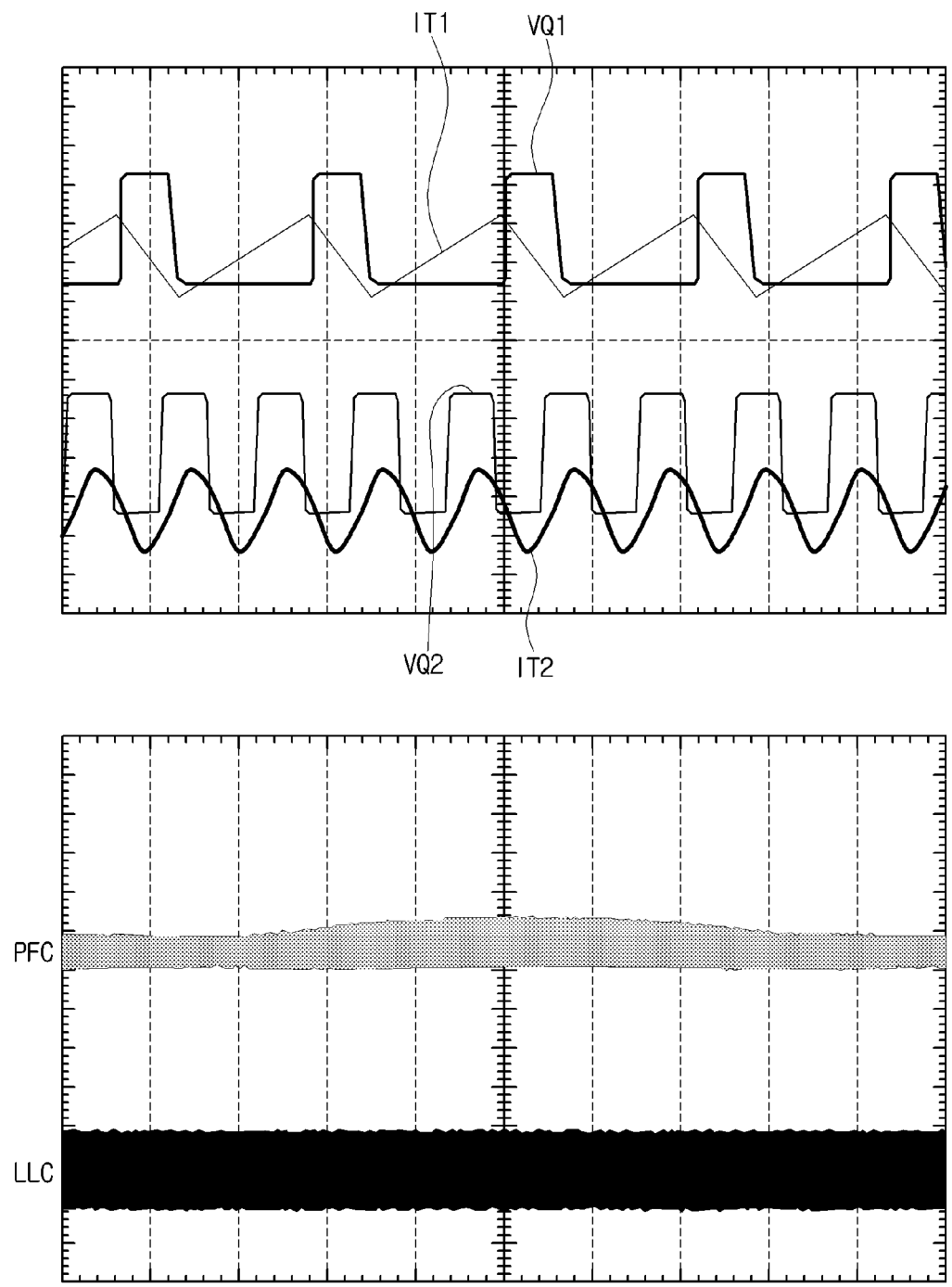
FIG. 19 is a view showing waveforms of each part when an operating frequency is set according to an embodiment.

FIG. 18 is a view showing waveforms of each part when an operating frequency is set according to the related art. FIG. 19 is a view showing waveforms of each part when an operating frequency is set according to an embodiment.

First, a main specification of a power supply related to FIG. 18 is as follows.

| | |
|---|---|
| Input voltage | 90 Vac~264 Vac |
| Output voltage and current | 24 V/4 A, 12 V/2 A |
| Output power capacity | 120 W |
| PFC circuit operating frequency (Fs) | 95 kHz~360.5 kHz |
| Transformer operating frequency (Fr) | 120 kHz |

In FIG. 18, VQ1 represents the voltage between both terminals of a switching device constituting the PFC circuit, and IT1 represents the current passing through both terminals of the switch device constituting the PFC circuit.

In addition, VQ2 represents the voltage between both terminals of a switching device constituting the transformer, and IT2 represents the current passing through both terminals of the switch device constituting the transformer.

As described above, according to the related art, the operating frequency of the PFC circuit was set at a minimum of 95 kHz and at a maximum of 360.5 kHz.

The operating frequency of the transformer was set at 120 kHz without regard to any operating frequencies of the PFC circuit.

Thus, as shown in the lower drawing of FIG. 18, the operating frequency of the transformer is set to be too lowered, and it may be confirmed that an oscillation is observed at a time point when the operating frequency of the PFC circuit is approximate to that of the transformer, that is, the operating frequency of the PFC circuit is equal to 104.1 kHz and the operating frequency of the transformer is equal to 114.5 kHz.

Next, a main specification of a power supply related to FIG. 19 is as follows.

| | |
|---|---|
| Input voltage | 90 Vac~264 Vac |
| Output voltage and current | 24 V/4 A, 12 V/2 A |
| Output power capacity | 120 W |
| PFC circuit operating frequency (Fs) | 95 kHz~360.5 kHz |
| Transformer operating frequency (Fr) | 251.9 kHz |

In FIG. 19, VQ1 represents the voltage between both terminals of a switching device constituting the PFC circuit, IT1 represents the current passing through both terminals of the switch device constituting the PFC circuit In addition, VQ2 represents the voltage between both terminals of a switching device constituting the transformer, and IT2 represents the current passing through both terminals of the switch device constituting the transformer.

As described above, the operating frequency of the PFC circuit according to the related art was set at a minimum of 95 kHz and a maximum of 360.5 kHz.

In addition, the operating frequency of the transformer was set at 251.9 kHz which is greater than half of 360.5 kHz, the maximum operating frequency of the PFC circuit.

Thus, it may be confirmed that the circuit is stably operated without any oscillating phenomena by setting the operating frequency of the transformer into a value greater than half of the maximum operating frequency of the PFC circuit.

The invention claimed is:

1. An integrated-type transformer comprising:
    a bobbin including an inserting part at a center, a first winding part formed at a first side with respect to the inserting part, and a second winding part formed at a second side with respect to the inserting part,
    a first magnetic member inserted in the inserting part of the bobbin;
    a second magnetic member inserted in the first winding part of the bobbin;
    a third magnetic member inserted in the second winding part of the bobbin;
    a first coil wound around the first winding part and constituting an inductor of a power factor correction circuit; and
    second and third coils wound around the second winding part and constituting a primary coil and a secondary coil of a transformer,
    wherein the third magnetic member is in direct physical contact with the first magnetic member in the second winding part of the bobbin,
    wherein an air gap is formed between the first magnetic member and the second magnetic member,
    wherein the second magnetic member is spaced apart, by the air gap, from the first magnetic member in the first winding part of the bobbin,
    wherein the first magnetic member includes two linear-shaped magnetic members inserted into the inserting part of the bobbin,
    wherein the first to third coils are disposed in a traversal direction,
    wherein the third coil constituting the secondary coil of the transformer is disposed between the first coil and the second coil,
    wherein the secondary coil is wound at a position closer to the inductor than the primary coil in the second winding part of the bobbin,
    wherein the bobbin includes:
        a first pin part protruded from a left side end of the bobbin to connect with the first coil,
        a second pin part protruded from a right side end of the bobbin to connect with the second coil,
        a third pin protruded from an upper end of the bobbin to connect with a first end of the third coil, and
        a fourth pin part protruded from a lower end of the bobbin to connect with a second end of the third coil.

2. The integrated-type transformer of claim 1, wherein the first magnetic member is a linear type magnetic member, and
    wherein the second magnetic member is a bending-type magnetic member, and the third magnetic member is a bending-type magnetic member.

3. The integrated-type transformer of claim 2, wherein the first winding part has a first hole into which the second magnetic member is inserted,
    wherein the second winding part has a second hole into which the third magnetic member is inserted.

4. The integrated-type transformer of claim 3, wherein the second and third coils are wound around the second winding part of the bobbin, respectively, while being spaced apart from each other by a predetermined interval.

5. The integrated-type transformer of claim 2, wherein each of the second and third magnetic members includes a linear-type body part, and upper and lower leg parts protruding from both ends of the body part perpendicularly to the body part, respectively, and has a U-shape.

6. The integrated-type transformer of claim 2, wherein each of the second and third magnetic members includes:
    a linear-type body part, upper and lower leg parts each protruding from both ends of the body part perpendicularly to the body part, and a central leg part protruding from a central portion of the body part perpendicularly to the body part.

7. The integrated-type transformer of claim 6, wherein a cross-sectional area of the central leg part corresponds to a sum of cross-sectional areas of the upper and lower leg parts, and
    the linear-type magnetic member has a cross-sectional area equal to or larger than a cross-sectional area of the central leg part.

8. The integrated-type transformer of claim 6, wherein side surfaces of the upper and lower leg parts of the second magnetic member are in direct physical contact with a side surface of the first magnetic member,
    wherein the air gap is formed between the side surface of the central leg part of the second magnetic member and a side surface of the first magnetic member, and
    wherein the central leg part of the second magnetic member is spaced apart from the side surface of the first magnetic member in the first winding part.

9. The integrated-type transformer of claim 1, wherein an operating frequency of the transformer has a value greater than half of a maximum value of an operating frequency of the power factor correction circuit.

10. The integrated-type transformer of claim 4, wherein the secondary coil is wound at a position closer to the inductor than the primary coil in the second winding part of the bobbin.

* * * * *